United States Patent [19]

Cohn

[11] 4,081,679
[45] Mar. 28, 1978

[54] DUAL CHANNEL CORRELATION RADIOMETER

[75] Inventor: Marvin Cohn, Baltimore, Md.

[73] Assignee: Westinghouse Electric Corporation, Pittsburgh, Pa.

[21] Appl. No.: 778,753

[22] Filed: Mar. 17, 1977

[51] Int. Cl.² ............................................. G01J 1/00
[52] U.S. Cl. .................................... 250/338; 325/363; 343/100 CL
[58] Field of Search ................ 250/338, 339; 325/363; 343/100 CL; 73/355 R

[56] References Cited

U.S. PATENT DOCUMENTS

| 3,325,644 | 6/1967 | Frye et al. ............................ 250/338 |
| 3,699,450 | 10/1972 | Rainal .................................. 325/363 |

Primary Examiner—Davis L. Willis
Attorney, Agent, or Firm—H. W. Patterson

[57] ABSTRACT

A radiometer in which independent thermal signals are combined to form first and second receiver channel input signals that are coherent with respect to each other. The first and second receiver channel input signals are independently processed in parallel receiver channels to provide first and second correlation signals, each of which include a thermal signal component and a noise signal component. The first and second correlation signals are then correlated to provide an output signal for the radiometer. If, in the combination of the independent first and second thermal signals to form the first and second receiver channel input signals, the portion of the first thermal signal included in one of the receiver channel input signals is quadrature phase shifted with respect to the portion of the first thermal signal included in the other receiver channel input signal, and, similarly, the portion of the second thermal signal that is included in the other receiver channel input signal is quadrature phase shifted with respect to the portion of the second thermal signal included in the one receiver channel input signal, an improvement in the radiometer sensitivity is realized. Alternatively, if the portion of the first thermal signal included in one receiver channel input signal is phase shifted one hundred eighty degrees with respect to the portion of the first thermal signal included in the other receiver channel input signal, the radiometer will discriminate between the independent thermal signals.

12 Claims, 2 Drawing Figures

DUAL CHANNEL CORRELATION RADIOMETER

BACKGROUND OF THE INVENTION

1. Field of the Invention

The presently disclosed invention is related to radiometers, and, more particularly, to radiometers which employ a dual polarization correlation technique.

2. Description of the Prior Art

As is known in the prior art, radiometers are passive devices which rely on the natural black body or gray body electromagnetic radiation from a target to detect signals of thermal origin. Black body radiators are those radiators having an emissivity equal to unity while gray body radiators have an emissivity less than unity, but greater than zero. Generally, thermal emission, which is determined by absolute temperature and emissivity, is the dominant contribution to the natural radiation of the target. However, reflected and scattered radiation from other thermal emitters such the sun and the local terrain may also be a significant factor. Typically, radiometers are responsive to signals included in the range of one micron wavelength $(1\mu)$ to one meter wavelength (1 m). However, signals in the optical ultraviolet or other regions of the electromagnetic spectrum are also of interest.

A variety of types of radiometers have been developed in the prior art. The most common type of microwave radiometer is a Dicke radiometer which contains a radio frequency switch that selectively connects the radiometer receiver between an antenna and a reference load having a known absolute temperature. A multiplier synchronously switches the detector output to an integrator. The switching rate for the Dicke radiometer is selected to lie above the spectrum of receiver channel gain fluctuations with rates between 20 and 1,000 hertz being commonly employed. The continuous comparison of the antenna output with the matched load provides a modulation of the antenna input signal when a target signal is present while noise generated within the radiometer receiver remains unmodulated. However, switching necessarily degrades the theoretical sensitivity of a radiometer relative to total power performance. Furthermore, in the region of millimeter wavelengths, the development of a suitable switch having acceptably low insertion loss and sufficient isolation over a wide bandwidth is difficult to accomplish.

In order to circumvent the need for a wide band, radio frequency switch, a correlation radiometer was subsequently developed. In the correlation radiometer known in the prior art, thermal signals were processed through two parallel receiver channels and then correlated with each other. The basis of operation is that the signal is identical in each channel and, therefore, correlated, and, furthermore, the internal noise developed within the two channels is independent, and therefore, uncorrelated. Accordingly, in the correlation process, the correlated signals would be distinguished from the uncorrelated noise of the two receiver channels. In the case of superheterodyne receivers, the receiver channels would consist of separate mixers and intermediate frequency (IF) amplifiers with the mixers excited from a common local oscillator. This prior art dual channel correlation radiometer provided an inherent 1.5dB sensitivity improvement over a Dicke radiometer in addition to the improvement resulting from the elimination of the insertion loss of the switch.

The advantages of the correlation radiometer are however, not obtained without encountering some difficulties. In order that the assumption that the noise of the two receiver channels is uncorrelated be valid, it is essential that the two channels be isolated. That is, the noise from one receiver channel should not enter the other receiver channel. Furthermore, in the superheterodyne receivers, it is important that the noise sidebands from the common local oscillator do not produce a correlated contribution to the noise in each receiver channel. The well known techniques of employing balanced mixers and/or designating the radiometer to a high intermediate frequency can be used to reduce the local oscillator noise to limit the effect of the local oscillator noise on the receiver noise figure. However, these measures may be inadequate since the correlated local oscillator noise contribution to the receiver channel noise signals may, nevertheless, be comparable or large in comparison to the signal of interest.

In the prior art, the mutual isolation of the input signals to the two receiver channels requires the use of a hybrid junction as the input signal power divider and/or incorporation of ferrite isolators at the input port of each channel. The ferrite isolators are approximately as difficult to develop as the RF switches employed with the Dicke radiometers. Furthermore, these ferrite isolators typically have an insertion loss comparable to the ferrite switch so that the improvement in sensitivity of the dual channel correlation radiometer, which is one of the principal advantages of the device, is negated. As used in the prior art, a hybrid junction which was the preferred solution for the isolation requirement, introduced a fourth port which was terminated to maintain isolation between the separate channels. Unless the termination of the fourth port was maintained at a temperature of absolute zero, it introduced a correlated noise contribution to each receiver channel, thereby degrading the sensitivity of the radiometer. In the prior art, this effect was minimized by maintaining the termination at a cryogenic temperature or, alternatively, by connecting the fourth port with an antenna directed to a cold sky region.

Accordingly, it was recognized that a radiometer which could avoid the isolation problems of the dual channel correlation radiometer and maintain the improvement in sensitivity over the Dicke radiometer would be desirable. Furthermore, it was also appreciated that a radiometer having additional sensitivity and/or discrimination capability would be very useful.

SUMMARY OF THE INVENTION

In accordance with the present invention, a radiometer is responsive to first and second thermal signals which are emitted from mutually independent energy sources to provide a radiometer output signal having improved sensitivity or, alternatively, to provide a radiometer output signal having discrimination capability. In the disclosed radiometer, the independent thermal signals are combined and then processed through separate, parallel, receiver channels. The output of the receiver channels is then correlated to provide the radiometer output signal. Where an improvement in the radiometer sensitivity is desired, the combination of the independent thermal signals is such that the portion of the first thermal signal included in one receiver channel input signal is in phase quadrature with respect to the portion of the first thermal signal included in the other receiver channel input signal. Furthermore, the portion of the second thermal signal included in the one receiver channel input signal is in phase quadrature with respect to the portion of the second thermal signal included in the other receiver channel input signal. Where discrimination capability in the radiometer output signal is to be realized, the portion of the second thermal signal included in one receiver channel input signal is one hundred eighty degrees out of phase with respect to the portion of the second thermal signal included in the other receiver channel input signal.

DESCRIPTION OF THE PREFERRED EMBODIMENT

Figure 1:
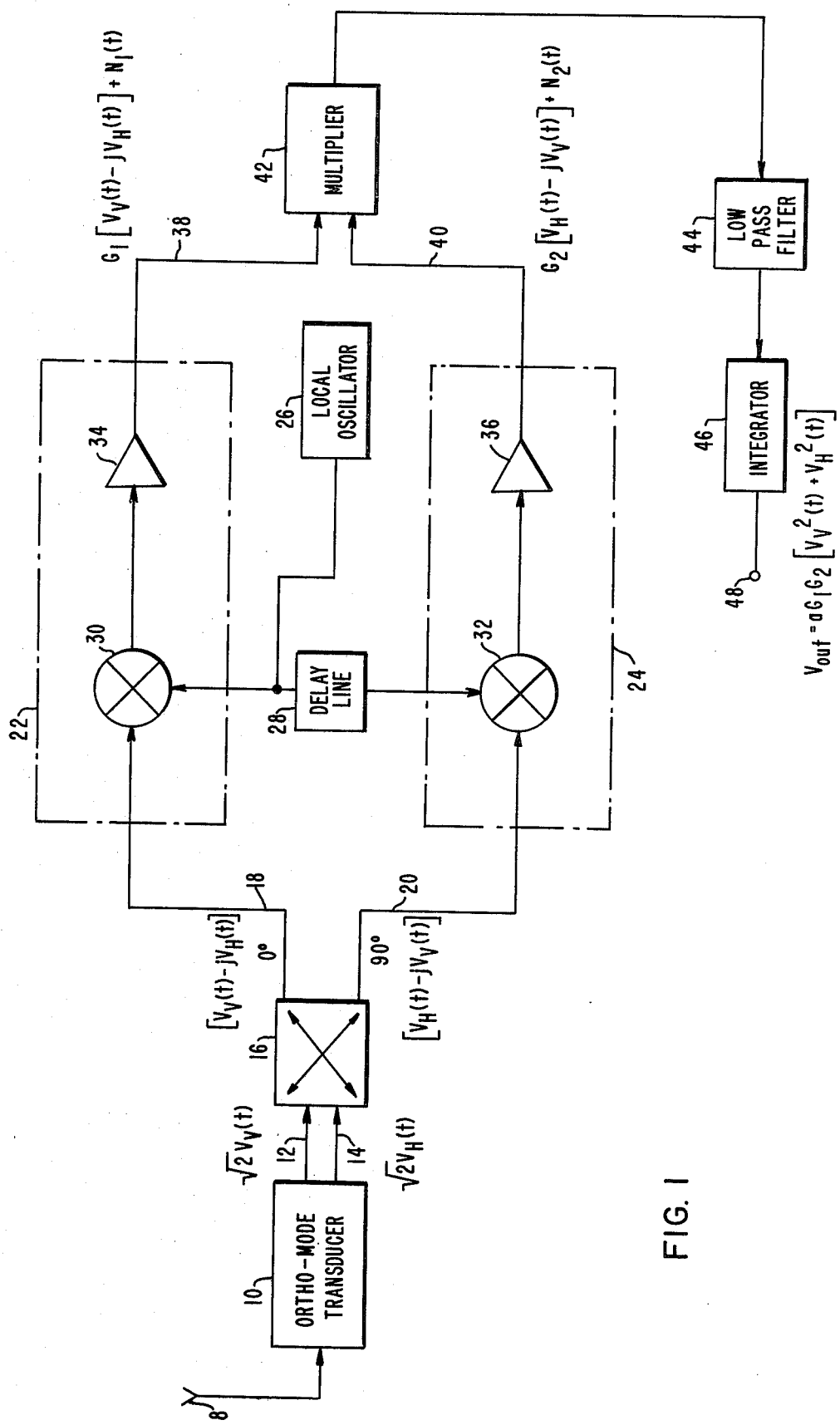
FIG. 1 is a block diagram of the preferred embodiment of the dual polarization correlation radiometer providing a radiometer output signal of improved sensitivity.

FIG. 1 shows, in accordance with the present invention, the preferred embodiment of the dual correlation radiometer in which the radiometer output signal provides improved sensitivity in comparison to radiometers of the prior art. As shown in FIG. 1, the disclosed radiometer includes an ortho-mode transducer 10 which provides first and second thermal output signals on lines 12 and 14 in response to thermal signals collected by the antenna 16. As understood by those skilled in the art, the thermal signals provided on lines 12 and 14 by the ortho-mode transducer 10 are time coincident, but represent thermal signals provided by the antenna 16 having orthogonally oriented electric fields. That is, the signals on lines 12 and 14 result from the orthogonally polarized signals received by the antenna 16. As is also known to those skilled in the art, such orthogonally polarized thermal signals are uncorrelated with respect to each other. For purposes of the present illustration, the polarized thermal signal on line 12 will be referred to as the vertically polarized thermal signal $\sqrt{2}V_V(t)$ and the polarized thermal signal on line 14 will be referred to as the horizontally polarized thermal signal $\sqrt{2}V_H(t)$.

Of course, the designation of the polarized signals as vertical or horizontal is relative and in a particular application of the invention as further described, the polarizations of the signals need not necessarily be vertical or horizontal with respect to the terrain or any other particular reference point.

It will also be apparent to those skilled in the art that the selection of different polarizations for the thermal signals on lines 12 and 14 is illustrative of only one basis of statistical independence between the two thermal signals, and that other basis may also be suitable. For example, the statistical independence between the thermal signals on lines 12 and 14 may be obtained through the substitution of two aquinted beams from two separate feed horns for the single antenna and the ortho-mode transducer while preserving the independence between the first and second thermal signals on lines 12 and 14. Other mechanisms for deriving first and second statistically independent thermal signals will also occur to those skilled in the art, all of which are contemplated as being within the scope of the present invention. One further example would be the provision of the thermal signals on lines 12 and 14 from left-hand and right-hand circularly polarized antennas, respectively.

A quadrature hybrid 16 is responsive to the thermal signals $\sqrt{2}V_V(t)$ and $\sqrt{2}V_H(t)$ provided on lines 12 and 14, respectively, to provide first and second receiver channel input signals on lines 18 and 20, respectively. The first receiver channel input signal on line 18 includes a portion of each of the thermal signals provided on lines 12 and 14. More specifically, the first receiver channel input signal on line 18 can be expressed as the sum of a portion of the vertical thermal signal $V_V(t)$ and a portion of the horizontal thermal signal $V_H(t)$ where the horizontal thermal signal portion is in the phase quadrature with respect to the horizontal thermal signal provided on line 14 ($V_V(t) - jV_H(t)$). Similarly, the second receiver channel input signal on line 20 is constituted from a portion of each of the thermal signals on lines 12 and 14. Specifically, the signal on line 20 can be expressed as the sum of a portion of the horizontal thermal signal and a portion of the vertical thermal signal, where the vertical thermal signal portion is in phase quadrature with respect to the vertical thermal signal on line 12 ($V_H(t) - jV_V(t)$). The phase shifts produced by the quadrature hybrid 16 will be in the range of eighty seven to ninety three degrees which is substantially a phase quadrature shift. Therefore, the signals that are phase shifted by the quadrature hybrid 16 will experience substantially a phase quadrature shift. Accordingly, the quadrature hybrid 16 comprises a means for combining the first and second thermal signals to form first and second receiver channel input signals having components that are correlated with respect to each other, the portion of the second thermal signal included in said first receiver channel input signal being in phase qudrature with respect to the portion of the second thermal signal included in said second receiver channel input signal, and the portion of the first thermal signal included in said second receiver channel input signal being in phase quadrature with respect to the portion of the first thermal signal included in said first receiver channel input signal. As will be apparent to those skilled in the art, when the particular embodiment of the present invention shown in FIG. 1 is modified for use in other regions of the electromagnetic spectrum, such as optical or ultraviolet regions other well known devices which perform an analogous function may be substituted for the quadrature hybrid 16.

The first and second receiver channel input signals 18 and 20 are provided to first and second receiver channels 22 and 24, respectively. The quadrature hybrid further serves to isolate the first and second receiver channels 22 and 24. The first and second receivers 22 and 24 include the mixers 30 and 32 and the intermediate frequency (IF) amplifiers 34 and 36, respectively. The example of the present invention shown in FIG. 1 is a superheterodyne radiometer, so that a local oscillator 26 and a delay line 28 are also included.

To accomplish the hetrodyning operation, the mixer 30 is responsive to the output signal of the local oscillator 26 and to the first receiver channel input signal to provide an intermediate frequency (IF) output. Similarly, the mixer 32 is responsive to the output of the delay line 28 and the second receiver channel input signal on line 20 to provide an intermediate frequency (IF) output. The local oscillator noise contributions to the separate receiver channels can be made to be uncorrelated by inserting a delay line between the common local oscillator and one of the mixers. The time delay provided by the delay line is a correlation interval, that is, the time interval in which the noise sidebands in the local oscillator signal provided to the mixer 30 become decorrelated with respect to the noise sidebands in the local oscillator signal provided to the mixer 32. This correlation interval is, approximately, the inverse of the bandwidth ($\beta$) of the component that sets the limit on the receiver channel bandwidth. Typically, this component is the receiver IF amplifier. Typically, the necessary time delay is on the order of nanoseconds and can be achieved with the use of a few feet of waveguide. Accordingly the delay line 28 is inserted between the local oscillator 26 and the mixer 32 to provide a time delay which is approximately equivalent to the inverse of the bandwidth of the IF amplifier 36.

Of course, it will be appreciated that, under circumstances where the frequencies of the thermal signals are such that the design of the radiometer permits, the present invention need not be a radiometer of the superheterodyne type. In this case the local oscillator 26, the delay line 28 and the mixers 30 and 32 would not be included.

The IF amplifier 34 provides a first correlation signal on line 38 in response to the input of the mixer 30 and the IF amplifier 36 provides a second correlation signal on line 40 in response to the output of the mixer 32.

The first correlation signal can be expressed as the sum of a thermal signal component $V_V(t) - jV_H(t)$ and a noise component $N_1(t)$ as follows:

$$G_1 [V_V(t) - jV_H(t)] + N_1(t) \tag{1}$$

where: $G_1$ is the gain of the IF amplifier 34.

The second correlation signal can be expressed as the sum of a thermal signal component $V_H(t) - jV_V(t)$ and a noise component $N_2(t)$ as follows:

$$G_2 [V_H(t) - jV_V(t)] + N_2(t) \tag{2}$$

where: $G_2$ is the gain of the IF amplifier 36.

The first and second correlation signals provided on lines 38 and 40, respectively, are provided to a multiplier 42 which multiplies the two signals together and transmits them to a low pass filter 44. The low frequency signals within the bandpass of the low pass filter 44 are provided to an integrator 46 whose output provides the radiometer output signal at an output terminal 48.

The radiometer output voltage appearing at terminal 48 can be expressed as:

$$V_{out} = aG_1G_2 [V_V^2(t) + V_H^2(t)] \tag{3}$$

where: $a$ is a proportionality factor whose value depends on the parameters of the multiplier 42, the low pass filter 44, and the integrator 46.

As will be apparent to those skilled in the art, the multiplier 42, the low pass filter 44, and the integrator 46 perform a correlation operation of the first and second correlation signals provided on lines 38 and 40, respectively. The multiplier 42, the low pass filter 44, and the integrator 46 therefore cooperate to provide a means for correlating the first correlation signal with the second correlation signal to provide a radiometer output signal.

In the operation of the preferred embodiment of the dual polarization correlation radiometer of FIG. 1, thermal signals are collected by the antenna and provided to the ortho-mode transducer 10. The ortho-mode transducer 10 provides a first thermal signal $\sqrt{2}V_V(t)$ comprised of the input signals having a vertical polarization on line 12 and also provides a second thermal signal $\sqrt{2}V_H(t)$ comprised of the input signals having a horizontal polarization on line 14. The signals on lines 12 and 14 are combined in the quadrature hybrid 16 to form first and second receiver channel input signals $V_V(t) - jV_H(t)$ and $V_H(t) - jV_V(t)$ on lines 18 and 20, respectively. The first and second receiver channel input signals on lines 18 and 20 have components $V_V$ and $V_H$ which are correlated with respect to each other as a consequence of their combination in the quadrature hybrid 16. That is, the $V_V(t)$ component of the first receiver channel input signal on line 18 is correlated with the $V_V(t)$ component of the second receiver channel input signal on line 20. Similarly, the $V_H(t)$ component of the first receiver channel input signal on line 18 is correlated with the $V_H(t)$ component of the second receiver channel input signal on line 20. The receiver channel input signals on lines 18 and 20 are provided to the first and second receiver channels 22 and 24, respectively.

In receiver channel 22, the first receiver channel input signal is converted to IF frequency in the mixer 30 and amplified in the IF amplifier 34 to form the first correlation signal $G_1 [V_V(t) - jV_H(t)] + N_1(t)$ on line 38. Similarly, the second receiver channel input signal on line 20 is down converted in the mixer 32 and amplified in the IF amplifier 36 to form the second correlation signal $G_2 [V_H(t) - jV_V(t)] + N_2(t)$ on line 40. Since the first and second receiver channels 22 and 24 are independent of each other, the noise $N_1(t)$ and $H_2(t)$ introduced by the mixers 30 and 32 and by the amplifiers 34 and 36 is uncorrelated for two receiver channels. Furthermore, since the heterodyning signal from the local oscillator 26 to the mixer 32 is delayed in the delay line 28 for approximately one correlation interval ($1/\beta$), the noise provided to the mixers 30 and 32 from the common local oscillator 26 is also uncorrelated for the two receiver channels.

The correlation of the first and second correlation signals in the multiplier 42, the low pass filter 44, and the integrator 46 causes the effective cancellation of the uncorrelated noise developed in the first and second receiver channels 22 and 24 while, at the same time proportionately magnifying the correlated receiver channel input signals from lines 18 and 20 which were amplified in the amplifiers 34 and 36.

Accordingly, the final output voltage ($V_{OUT}$) is proportional to the sum of the incident thermal energy in both polarizations ($V_V^2(t) + V_H^2(t)$).

An exact signal to noise ratio analysis of the disclosed circuit reveals that the fluctuation noise, or receiver channel noise, is negligibly affected. Accordingly, the signal to noise ratio, or the radiometer sensitivity is doubled since $V_V^2(t) = V_H^2(t)$. Specifically, the theoretical sensitivity for the dual polarization correlation radiometer herein disclosed is:

$$(\Delta T)_{min} = \frac{\sqrt{2}}{2} \cdot \frac{(F-1) 290° \text{ K}}{\sqrt{\beta \cdot \tau}} \tag{4}$$

where:

$(\Delta T)_{min}$ is the radiometer sensitivity;
$F$ is the receiver noise figure;
$\beta$ is the pre-detection signal bandwidth; and τ is the post detection integration time.

The disclosed radiometer is useful in applications involving thermal emanations from black or gray body radiators having substantial energy contributions from more than one polarization. For example, atmospheric constituent gases which are uncorrelated in the orthogonally polarized orientations, but whose radiant energies $(V_V)^2$ and $(V_H)^2$ are equal. Typically the presently disclosed dual polarization correltation radiometer having improved sensitivity is employed in applications such as meterological sensing by measuring emissions from an atmospheric gas.

Figure 2:
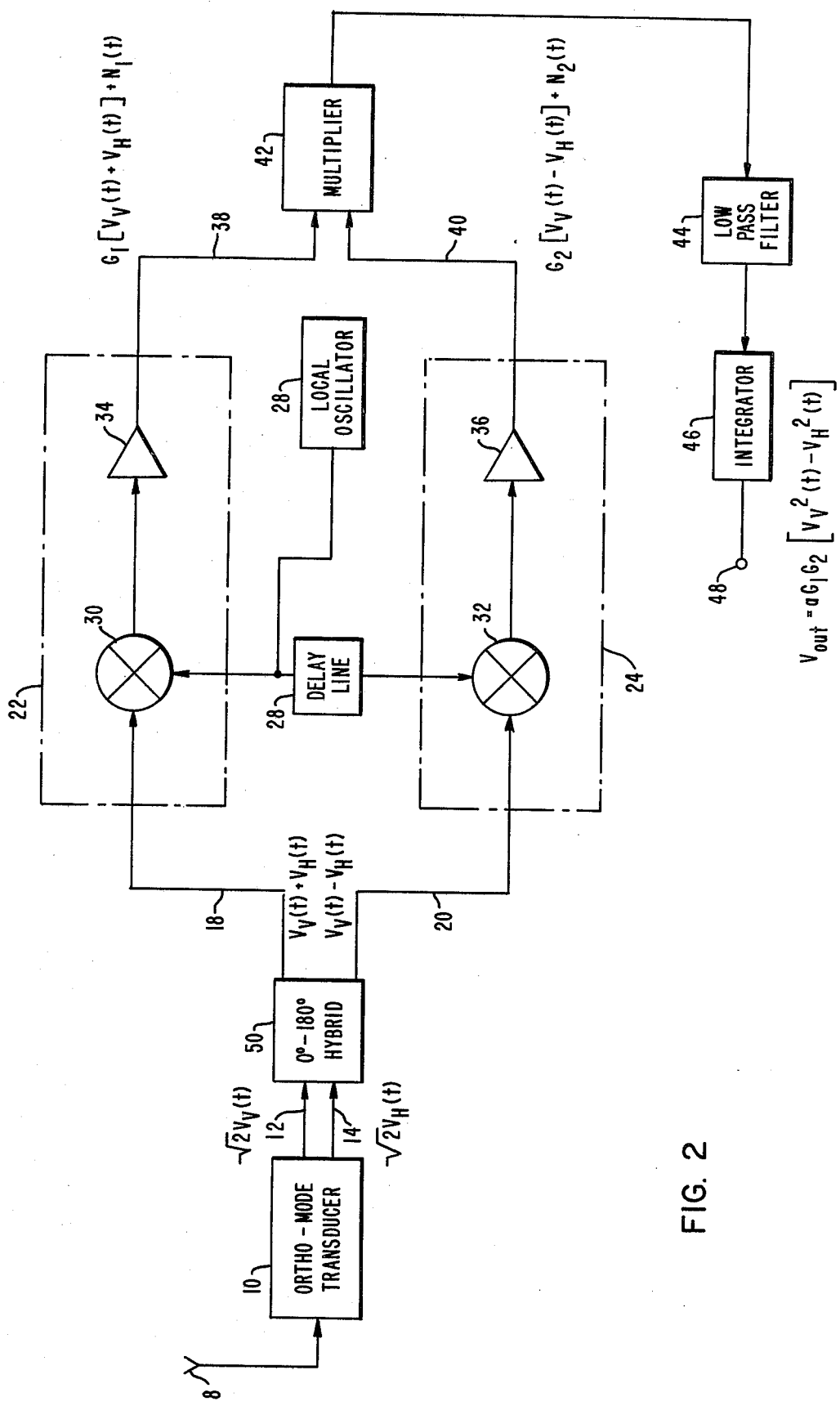
FIG. 2 is an alternative embodiment of the disclosed dual polarization correlation radiometer having a radiometer output signal with discrimination capability.

FIG. 2 shows an alternative embodiment of the disclosed dual polarization correlation radiometer in which a 180° hybrid 50 has been substituted for the quadrature hybrid 16 of FIG. 1. In other respects, the other block diagram of FIG. 2 is similar to the block diagram of FIG. 1. However, due to the differences between the 180° hybrid 50 and the quadrature hybrid 16, the results achieved by the radiometer shown in FIG. 2 are somewhat different. Specifically, the output signal of the radiometer of FIG. 2 has discrimination capability for the polarization sensitive targets.

As with the quadrature hybrid 16 of FIG. 1, the 180° hybrid of FIG. 2 is responsive to the first and second thermal signals on lines 12 and 14, respectively. However, in FIG. 2, the 180° hybrid 50 provides a first receiver channel input signal on line 18 which is comprised of the sum of portions of the first and second thermal signals.

Therefore, the first correlation signal can be expressed as:

$$G_1 [V_V(t) + V_H(t)] + N_1(t) \quad (5)$$

where:
$G_1$ is the gain of the IF amplifier 34; and
$N_1(t)$ is the noise introduced by the local oscillator 26, the mixer 30, and the IF amplifier 34.

Similarly, the second receiver channel input signal on line 20 is comprised of the difference between portions of the thermal signal provided on lines 12 and 14.

The second correlation signal provided on line 40 can be expressed as:

$$G_2 [V_V(t) - V_H(t)] + N_2(t) \quad (6)$$

where:
$G_2$ is the gain of the IF amplifier 36; and
$N_2(t)$ is the noise introduced by the local oscillator 26, the delay line 28, the mixer 32 and the IF amplifier 36.

Accordingly, the one hundred eighty degree hybrid 50 constitues a means for combining the first and second thermal signals to form first and second receiver channel input signals that have components which are correlated with respect to each other, the first thermal signal included in said first receiver channel input signal being in phase with the first thermal signal included in said second receiver channel input signal, and that the second thermal signal included in said first receiver channel input signal being of opposite phase with respect to the second thermal signal included in said second receiver channel input signal.

By comparison to the first and second receiver channel input signals provided by the quadrature hybrid 16 of FIG. 1, it will be seen that the 180° hybrid 50 of FIG. 2 provides first and second receiver channel input signals which have in-phase components of said first thermal signal $V_V(t)$ and opposite phase components of said second thermal signal $V_H(t)$. It is apparent that these first and second receiver channel input signals are in contrast to the first and second receiver channel input signals provided by the quadrature hybrid 16 of FIG. 1. The consequence of this difference in the first and second receiver channel input signals is that the radiometer output signal at terminal 48 is proportional to the difference between the energy contained in the first and second thermal signals provided on lines 12 and 14. As with the quadrature hybrid 16, when the particular embodiment of the present invention shown in FIG. 2 is modified for use in other regions of the electromagnetic spectrum, such as optical or ultraviolet regions, other well known devices which perform an analogous function may be substituted for the one hundred eighty degree hybrid 50. As with the radiometer of FIG. 1, the receiver noise signals $N_1(t)$ and $N_2(t)$ of the receiver channels 22 and 24, respectively, have been cancelled as a result of the correlation process performed by the multiplier 42, the low pass filter 44, and the integrator 46.

The following equation shows the relation of the radiometer output voltage to the first and second correlation signals of the expressions (5) and (6):

$$V_{OUT} = aG_1G_2 [V_V^2(t) - V_H^2(t)] \quad (7)$$

where:
$a$ is a proportionality factor whose value depends on the parameters of the multiplier 42, the low pass filter 44, and the integrator 46.

Accordingly, the dual polarization correlation radiometer shown in FIG. 2 provides discrimination capability for targets having a distinctive radiometric signature, such as polarization sensitive targets. A typical application of this radiometer would be in a seeker system in which the radiometer is used to distinguish between smooth man-made surfaces and rough natural surfaces. Another example of the use of the radiometer of FIG. 2 is in meterological applications such as determining the temperature of the surface of a body of water. More specifically, for a water surface viewed at angles other than normal to the surface, Brewster angle effects result in a different emissivity for radiation polarized in and perpendicular to the plane of incidence. For wave action on the water surface, there is a large deviation of brightness in temperature between the cases where the waves are oriented parallel to the electric field orientation as opposed to waves oriented perpendicular to the electric field orientation. These sea state effects, which are a function of wind speed, are well known and have been publically documented.

As with the example of the radiometer shown in FIG. 1, the radiometer of FIG. 2 is not to be construed as being limited to applications involving orthogonally polarized thermal signals on lines 12 and 14. Rather, as will be apparent to those skilled in the art, the radiometer disclosed in FIG. 2 will provide an output signal having discrimination capability for any two thermal signals emitted from independent sources exhibiting thermal signals having divergent emissivity. Therefore, as with the radiometer of FIG. 1, the ortho-mode transducer 10 and single antenna 16 could be replaced with two feed horns having independent squinted beams. Accordingly, the scope of the presently disclosed radiometer is intended to extend to such other applications.

In accordance with the foregoing description, a dual channel correlation radiometer has been described which avoids the isolation complications of correlation radiometers of the prior art while providing additional sensitivity or, alternatively, discrimination capabilities.

I claim:

1. A radiometer that is responsive to first and second thermal signals from first and second mutually independent energy sources respectively, said radiometer comprising:

means for combining the first and second thermal signals to form first and second receiver channel input signals having components that are correlated with respect to each other, the second thermal signal included in said first receiver channel input signal being in phase quadrature with respect to the second thermal signal included in said second receiver channel input signal, and the first thermal signal included in said second receiver channel input signal being in phase quadrature with respect to the first thermal signal included in said first receiver channel input signal;

a first receiver channel that is responsive to the first receiver channel input signal, said first receiver channel amplifying the first input signal to provide a first correlation signal;

a second receiver channel that is responsive to the second receiver channel input signal, said second receiver channel amplifying the second input signal to provide a second correlation signal; and means for correlating the first correlation signal with the second correlation signal to provide a radiometer output signal, the correlation of first and second correlation signals improving the sensitivity of the radiometer.

2. A radiometer that is responsive to first and second thermal signals from first and second mutually independent energy sources respectively, said radiometer comprising:

means for combining the first and second thermal signals to form first and second receiver channel input signals having components that are correlated with respect to each other, the second thermal signal included in said first receiver channel input signal being in phase quadrature with respect to the second thermal signal included in said second receiver channel input signal, and the first thermal signal included in said second receiver channel input signal being in phase quadrature with respect to the first thermal signal included in said first receiver channel input signal;

a first receiver channel that is responsive to the first receiver channel input signal, said first receiver channel amplifying the first input signal to provide a first correlation signal having a thermal signal component and a noise signal component;

a second receiver channel that is responsive to the second receiver channel input signal, said second receiver channel amplifying the second input signal to provide a second correlation signal having a thermal signal component and a noise signal component, the thermal signal component of the first correlation signal being correlated with respect to the thermal signal component of the second correlation signal and the noise signal component of the first correlation signal being uncorrelated with respect to the noise signal component of the second correlation signal; and means for correlating the first correlation signal with the second correlation signal to provide a radiometer output signal, the correlation of the correlated thermal signal components of the first and second correlation signals in contrast to the uncorrelated noise signal components of the first and second correlation signals improving the sensitivity of the radiometer.

3. A dual polarization correlation radiometer comprising:

means for detecting first and second thermal signals, said thermal signals having first and second polarizations respectively;

means for combining the in-phase component of the first thermal signal with the quadrature component of said second thermal signal to provide a first receiver channel input signal, and for combining the in-phase component of the second thermal signal with the quadrature component of said first thermal signal to provide a second receiver channel input signal;

a local oscillator for providing a heterodyning signal;

a first receiver channel that is responsive to one of the first and second receiver channel input signals and to the heterodyning signal to mix the heterodyning signal with the one of the said first and second receiver channel input signals;

means responsive to said local oscillator for delaying said heterodyning signal;

a second receiver channel that is responsive to the other of the first and second receiver channel input signals and to the delaying means, to mix the output of said delaying means with the other of said first and second receiver channel input signals; and means for correlating the outputs of said first and second receiver channels to provide a radiometer output signal having improved sensitivity.

4. A dual polarization correlation radiometer comprising:

means for detecting thermal signals having first and second polarizations;

a quadrature hybrid that is responsive to the first and second thermal signals detected by said detecting means, said quadrature hybrid providing a first receiver channel input signal which includes the in-phase component of said first thermal signal and the quadrature component of said second thermal signal, said quadrature hybrid also providing a second receiver channel input signal which includes the difference between the in-phase component of said second thermal signal and the quadrature component of said first thermal signal;

a local oscillator that provides a heterodyning signal;

a first receiver channel that is responsive to the first receiver channel input signal of the quadrature hybrid and to the heterodyning signal of the local oscillator to provide a first correlation signal;

a delay line that is responsive to the heterodyning signal of said local oscillator, said delay line being operative to delay the heterodyning signal by a predetermined amount;

a second receiver channel that is responsive to the second receiver channel input signal of the quadrature hybrid and to the output of the delay line to provide a second correlation signal; and means for correlating the first and second correlation signals to provide a radiometer output signal that is proportional to the sum of the first and second thermal signals while maintaining the noise level substantially constant such that the radiometer sensitivity is increased.

5. A dual polarization correlation radiometer having improved sensitivity, said radiometer comprising:
an ortho-mode transducer for detecting first and second thermal signals having first and second polarizations respectively, said first polarization being orthogonal with respect to said second polarization;
a quadrature hybrid that is responsive to the first and second orthogonally polarized thermal signals detected by said ortho-mode transducer, said quadrature hybrid providing a first receiver channel input signal substantially equal to the difference between the in-phase component of said first thermal signal and the quadrature component of said second thermal signal, said quadrature hybrid also providing a second receiver channel input signal substantially equal to the difference between the in-phase component of said second thermal signal and the quadrature component of said first thermal signal;
a local oscillator that provides a heterodyning signal;
a first mixer that is responsive to the first receiver channel input signal of the quadrature hybrid and to the heterodyning signal of the local oscillator to provide a first intermediate frequency signal;
a first amplifier that is responsive to the first intermediate frequency signal to provide a first correlation signal having a thermal signal component and a noise component;
a delay line that is responsive to the heterodyning signal of the local oscillator to delay the heterodyning signal for a correlation time interval;
a second mixer that is responsive to the second receiver channel input signal of the quadrature hybrid and to the delayed heterodyning signal of the delay line to provide a second intermediate frequency signal;
a second amplifier that is responsive to the second intermediate frequency signal to provide a second correlation signal having a thermal signal component and a noise component;
a multiplier that is responsive to the first and second correlation signals to form a product signal;
a low pass filter that is responsive to the product signal to provide a product signal within a predetermined bandwidth; and
an integrator that is responsive to the output of the low pass filter to provide a radiometer output signal that is proportional to the sum of the energies of the thermal signals having first and second polarizations and which is substantially independent of the noise components of said first and second correlation signals, thereby providing improved sensitivity.

6. A radiometer that is responsive to first and second thermal signals from first and second mutually independent energy sources respectively, said radiometer comprising:
means for combining the first and second thermal signals to form first and second receiver channel input signals having components that are correlated with respect to each other, the first thermal signal included in said first receiver channel input signal being in-phase with the first thermal signal included in said second receiver channel input signal, and the second thermal signal included in said first receiver channel input signal being of opposite phase with respect to the second thermal signal included in said second receiver channel input signal;
a first receiver channel that is responsive to the first receiver channel input signal, said first receiver channel amplifying the first receiver channel input signal to provide a first correlation signal;
a second receiver channel that is responsive to the second receiver channel input signal, said second receiver channel amplifying the second receiver channel input signal to provide a second correlation signal; and
means for correlating the first correlation signal with the second correlation signal to provide a radiometer output signal, the correlation of the first and second correlation signals providing discrimination capability between said first and second thermal signals having a different emissivity.

7. A radiometer having discrimination capability for polarization sensitive targets, said radiometer comprising:
means for detecting first and second thermal signals, said first and second thermal signals having first and second polarizations respectively;
a hybrid junction that is responsive to the first and second thermal signals, said hybrid junction providing first and second receiver input signals, said first receiver channel input signal including the sum of said first and second thermal signals and said second receiver channel input signal including the difference of said first and second thermal signals;
a local oscillator providing a heterodyning signal;
a first receiving channel that is responsive to one of said first and second receiver input signals and to the heterodyning signal, said first receiving channel providing a first correlation signal in response to said one receiver channel input signal and the heterodyning signal;
means for delaying the heterodyning signal, said means being responsive to the heterodyning signal of the local oscillator;
a second receiving channel that is responsive to the other of said first and second receiver channel input signals of said hybrid junction and to the output signal of said delaying means, said second receiving channel providing a second correlation signal in response to said other receiver channel input signal and delaying means output signal; and
means for correlating the first and second correlation signals to provide a radiometer output signal that is responsive to polarization sensitive targets.

8. A radiometer having discrimination capability for polarization sensitive targets, said radiometer comprising:
an ortho-mode transducer for detecting first thermal signals having a first predetermined polarization, and for detecting second thermal signals having a second predetermined polarization;
a hybrid junction that is responsive to the first and second thermal signals, said hybrid junction providing first and second receiver input signals, said first receiver channel input signal including the sum of portions of said first and second thermal signals and said second receiver channel input signal including the difference of portions of said first and second thermal signals, said first thermal signal in one of said first and second receiver channel input signals being substantially one hundred eighty degrees out-of-phase with respect to said first thermal signal in the other of said first and second receiver channel input signals;

a local oscillator providing a heterodyning signal;

a first receiving channel that is responsive to said first receiving channel input signal and to the heterodyning signal, said first receiving channel providing a first correlation signal;

means for decorrelating the noise component of the heterodyning signal with respect to the noise component of the heterodyning signal provided to the first receiving channel;

a second receiving channel that is responsive to said second receiving channel input signal and to the output signal of said decorrelating means, said second receiving channel providing a second correlation signal; and means for correlating the first and second correlation signals to provide a radiometer output signal that is capable of discriminating polarization sensitive targets from background clutter.

9. A method for improving the sensitivity of a radiometer that is responsive to first and second thermal signals from first and second mutually independent energy sources, said method comprising:

combining the first and second thermal signals to form first and second receiver channel input signals having components that are correlated with respect to each other, the portion of the second thermal signal included in said first receiver channel input signal being in phase quadrature with respect to the portion of the second thermal signal included in said second receiver channel input signal, and the portion of the first thermal signal included in said second receiver channel input signal being in phase quadrature with respect to the portion of the first thermal signal included in said first receiver channel input signal;

amplifying the first input signal to provide a first correlation signal having a thermal signal component and a noise signal component;

amplifying the second input signal to provide a second correlation signal having a thermal signal component and a noise signal component, the thermal signal component of the first correlation signal being correlated with respect to the thermal signal component of the second correlation signal and the noise signal component of the first correlation signal being uncorrelated with respect to the noise signal component of the second correlation signal; and correlating the first correlation signal with the second correlation signal to provide a radiometer output signal, the correlation of the correlated thermal signal components of the first and second correlation signals in contrast to the uncorrelated noise signal components of the first and second correlation signals improving the sensitivity of the radiometer.

10. A method for improving the sensitivity of a radiometer responsive to first and second thermal signals from two independent energy sources, said method comprising:

combining the first thermal signal from one energy source with the second thermal signal from the other energy source to provide a first receiver channel input signal to a first receiver channel, the first input signal including a component that is in phase quadrature relationship to the first thermal signal;

combining the second thermal signal with the first thermal signal to provide a second receiver channel input signal to a second receiver channel, the second input signal including a component that is in phase quadrature relationship with respect to the second thermal signal;

amplifying the first input signal to the first receiver channel to provide a first correlation signal having a thermal signal component and a noise signal component;

amplifying the second input signal to the second receiver channel to provide a second correlation signal having a thermal signal component and a noise signal component; and correlating the first and second correlation signals to increase the ratio of the correlated thermal signal component of the first and second input signals with respect to the uncorrelated noise signal components of the first and second correlation signals.

11. A method for improving the sensitivity of a radiometer responsive to first and second thermal signals from first and second mutually independent energy sources, said method comprising:

combining said first and second thermal signals to form first and second receiver channel input signals, a first thermal signal component included in the first receiver channel input signal being in phase quadrature with respect to the first thermal signal and a second thermal signal component included in the second receiver channel input signal being in phase quadrature with respect to the second thermal signal, said first and second receiver channel input signals being isolated from each other;

amplifying the first receiver channel input signal to provide a first correlation signal;

amplifying the second receiver channel input signal to provide a second correlation signal;

correlating the first correlation signal with the second correlation signal to improve the sensitivity of the radiometer output signal.

12. A method for discriminating between energy sources having a different emissivity or different temperatures in which a radiometer is responsive to first and second thermal signals, said method comprising:

combining the first and second thermal signals to form first and second receiver channel input signals having components that are correlated with respect to each other, the first thermal signal included in said first receiver channel input signal being in-phase with the first thermal signal included in said second receiver channel input signal, and the second thermal signal included in said first receiver channel input signal being of opposite phase with respect to the second energy thermal signal included in said second receiver channel input signal;

amplifying the first input signal to provide a first correlation signal;

amplifying the second input signal to provide a second correlation signal; and correlating the first correlation signal with the second correlation signal to provide a radiometer output signal, the correlation of the first and second correlation signals providing discrimination capability between said first and second thermal signals.

* * * * *